Oct. 10, 1950     R. A. BIERWIRTH     2,525,336
METHOD FOR SIMULTANEOUSLY INDUCTION HEATING
A PLURALITY OF ELEMENTS
Original Filed June 30, 1943
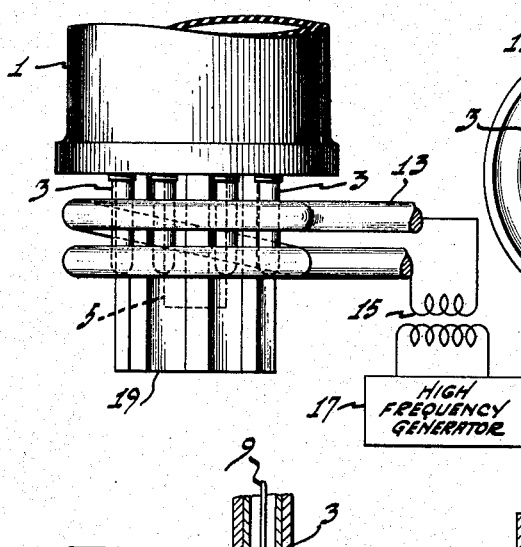
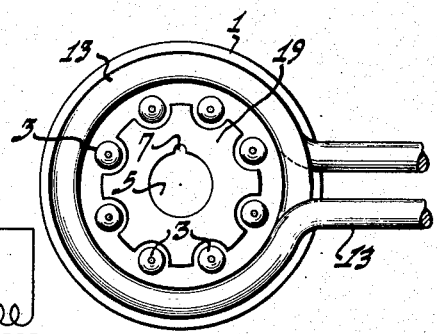
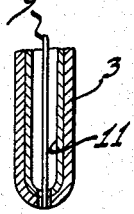
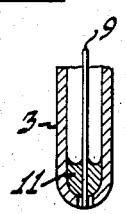
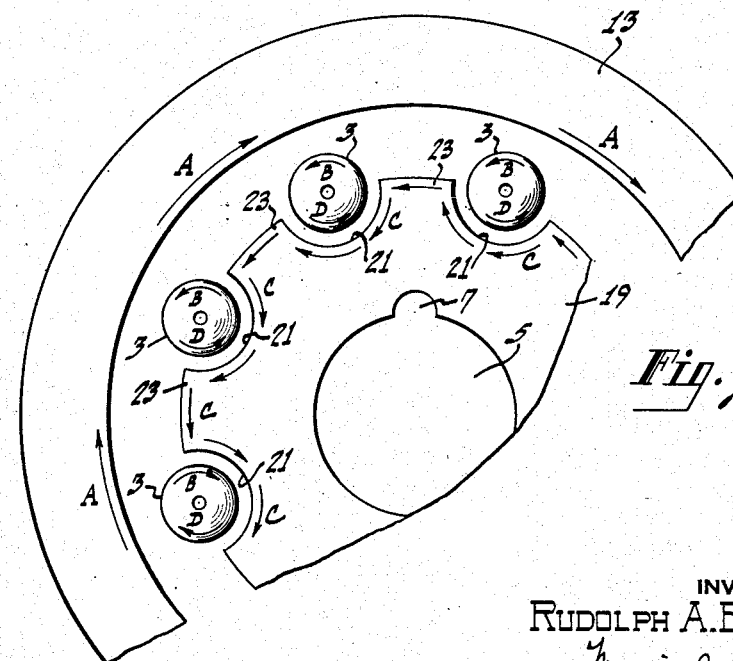
INVENTOR
RUDOLPH A. BIERWIRTH
BY
ATTORNEY Patented Oct. 10, 1950

2,525,336

UNITED STATES PATENT OFFICE 2,525,336

METHOD FOR SIMULTANEOUSLY INDUCTION HEATING A PLURALITY OF ELEMENTS

Rudolph A. Bierwirth, Mount Prospect, Ill., assignor to Radio Corporation of America, a corporation of Delaware Original application June 30, 1943, Serial No. 492,813. Divided and this application November 14, 1947, Serial No. 786,088

4 Claims. (Cl. 219—13)

This invention relates to a method of induction heating, and more particularly to a method of simultaneously heating a plurality of conductive elements by induction with high efficiency, the present application being a division of my copending application Serial No. 492,813, filed June 30, 1943, and issued June 8, 1948 as Patent Number 2,442,968.

In the manufacture of radio tubes, for example, the leads from the several electrodes are brought down through hollow terminal pins or prongs on the tube envelope and connection of the tube to an external circuit is made through such pins. The electrode leads are usually soldered to the prongs by means of solder therewithin. Heretofore, in order to melt the solder, it has been customary to heat the prongs by means of a gas flame or the like, but this is not altogether satisfactory since it is difficult to control the flow and setting of the solder when a flame is used as the source of heat.

The primary object of my present invention is to provide an improved method of heating radio tube prongs and other similar conductive elements which will not be subject to the disadvantages found in prior art methods.

More particularly, it is an object of my present invention to provide an improved method as aforesaid which will heat the work rapidly and with high efficiency.

Another object of my present invention is to provide an improved method of heating radio tube prongs as above set forth wherein the heating is accomplished by induction and wherein efficient coupling between the heating apparatus and the work is effected.

In accordance with my present invention, the tube base pins or prongs are coated internally with solder and the solder is melted and caused to run to the ends of the pins for soldering in the lead wires. The pins are heated by induction by placing around them a small, helical inductor carrying radio frequency current. The prongs are usually arranged in a circular path and the inductor is arranged concentrically therewith, being spaced from the pins only a short distance. Even under this condition, however, and particularly where the pins or prongs are made of brass or other non-ferrous material, the heating efficiency will not be very great because of the relatively poor coupling between the inductor and the prongs. To overcome this, I place within the circle of pins a concentrator in the form of a properly shaped block or mass of copper. This mass is inductively related to both the prongs and the inductor. When radio frequency current is passed through the inductor, it induces currents in the concentrator as well as in the prongs. The current in the concentrator, in turn, induces additional current in the prongs, thereby intensifying the current in the latter and causing all of the prongs to become heated rapidly and simultaneously to the melting temperature of the solder. The melted solder then runs down to the ends of the pins and unites the lead wires to their respective pins or prongs.

The novel features that I consider characteristic of my invention are set forth with particularity in the appended claims. The invention itself, however, as well as additional objects and advantages thereof, will best be understood from the following description, when read in connection with the accompanying drawing in which Figure 1 is a side elevation of one form of heating device for carrying out the method of my present invention and shown applied to the prongs of a radio tube.

Figure 2 is a bottom plan view thereof,

Figure 3 is a fragmentary, sectional view of one of the prongs with the lead wire therein prior to the soldering operation, Figure 4 is a view similar to Figure 3 but showing the lead wire soldered to the prong, and Figure 5 is an enlarged, fragmentary view of a portion of the apparatus shown in Figure 2.

Referring more particularly to the drawing, wherein similar reference characters designate corresponding parts throughout, there is shown a radio tube 1 provided with a plurality of discrete, hollow, base pins or prongs 3 spaced from each other in a circular path and with an aligning plug 5 formed with an aligning key 7, as best seen in Figs. 2 and 5. A lead wire 9 extends into each of the prongs 3 and connects with a separate one of a plurality of electrodes within the envelope of the tube 1 in well known manner.

In order to provide good electrical contact between the leads 9 and their respectively associated prongs 3, each of the prongs or pins 3 may be lined with relatively low melting point solder 11.

The solder may be heated to melting temperature by means of a primary inductor 13 of one or more turns connected through a transformer 15 to a source of high frequency electrical energy 17, such as a radio frequency oscillation generator of the vacuum tube type. The inductor 13 is placed around the prongs 3 in fairly close proximity thereto so as to obtain close coupling between the inductor and the several prongs. Since, however, the inductor 13 does not surround each of the several prongs individually, the magnetic coupling between the inductor 13 and the prongs 3 will not be very close.

To increase the efficiency of coupling, I provide a concentrator or focus inductor 19 in the form of a block or mass of copper which fits over the aligning plug 5 and its key 7 and is arranged concentrically with the coil 13 and the circular path of the prongs 3. The concentrator 19, which is essentially a secondary inductor, is provided with a plurality of longitudinally extending, circumferentially spaced, peripheral slots or grooves 21 corresponding in number to the number of prongs 3. As clearly seen from Figs. 2 and 5, the arrangement is such that each of the grooves 21 receives a separate prong 3 in substantially concentric relation therewith and in close proximity thereto, with the projections 23 on the concentrator 19 between the grooves 21 extending into the spaces between the respective prongs. In this way, close magnetic coupling is obtained not only between the concentrator 19 and the prongs 3, but between the concentrator 19 and the primary inductor 13 as well, so that the inductor 13, the prongs 3, and the concentrator 19 are all closely coupled together magnetically.

Upon application of power to the inductor 13, the current flowing therein, represented by the arrows A, induces current in each of the prongs 3, represented by the arrows B, and current in the concentrator 19, represented by the arrows C. The latter, in turn, also induces current in each of the prongs 3, represented by the arrows D. It will be seen, therefore, that the current B, D in each of the prongs 3 is much more intense than would be the case if the concentrator 19 were omitted and only the current represented by the arrows B were induced in the prongs. The induced currents B, D heat all of the prongs simultaneously and relatively rapidly to the melting temperature of the solder 11, whereupon the solder flows down toward the ends of the pins to bond the lead wires 9 to their respective prongs 3, as shown in Fig. 4.

In one installation according to the present invention, the inductor 13 was made of ⅛ inch O. D. copper tubing through which water was circulated for cooling. The concentrator 19 was constituted by a block of copper with grooves 21 cut therein to clear the pins 3 and a hole provided at the center to accommodate the aligning plug and its key. Thus, the block 19 formed a closed, single turn ring. The block 19 was of sufficient mass to permit the heat developed therein to be conducted away and dissipated into the surrounding air. It will be noted that the current C induced in the concentrator block 19 flows on the outer skin thereof and since it is in a direction opposite to that of the current A in the inductor 13, it sets up a magnetic field which opposes that produced by the current A. Thus, the field inside of the concentrator is practically zero while the field between the concentrator and the inductor or coupling coil 13 is more intense than if the concentrator were not present. By way of example, it may be pointed out that, with a tube having brass pins or prongs 3, a certain current through the coupling coil heated the pins to the soldering temperature in approximately 4 seconds with an overall efficiency of approximately 30.5 percent. With the concentrator removed, the heating time required was 12 seconds for the same current through the coupling coil and the efficiency was found to be about 20 percent. The current was supplied to the inductor 13 in each case at a frequency of 1,000,000 cycles per second.

Although I have shown and described in detail one form of apparatus for practicing my invention, it will undoubtedly be apparent to those skilled in the art that many other forms thereof, as well as variations in the particular one described, are possible. Thus, the concentrator 19 may be of any suitable shape as, for example, cylindrical, with the grooves 21 omitted. Also, the concentrator may be water cooled if found necessary. Furthermore, in some cases, it may be found desirable to place the inductor 13 within the circle defined by the prongs 3 or other similar elements to be heated, and the concentrator 19 disposed around the prongs or the like. Other similar changes will, no doubt, readily suggest themselves to those skilled in the art. I therefore desire that my invention shall not be limited except insofar as is made necessary by the prior art and by the spirit of the appended claims.

What I claim is:

1. The method of heating a plurality of workpieces of electroconductive material with the aid of two inductively related inductors one of which is adapted to be inserted coaxially within the other and one of which is a closed inductor, which comprises bringing said workpieces and said inductors all into close inductive relation with each other with the workpieces in spaced substantially parallel relation to each other between said inductors, conforming at least one of said inductors to each of said workpieces to enhance the inductive coupling therewith, and passing a high frequency alternating current through one of said inductors whereby to induce current in both said workpieces and the other of said inductors, the current so induced in said workpieces serving to effect partial heating of said workpieces and the current in said other inductor serving, in turn, to induce additional current in said workpieces for effecting further heating of said workpieces.

2. The method of heating a plurality of workpieces of electroconductive material with the aid of a primary inductor and a closed secondary inductor disposed co-axially within and in close inductive relation to said primary inductor which comprises placing said workpieces in spaced substantially parallel relation to each other between said inductors and conforming said closed secondary inductor to each of said workpieces whereby to bring said workpieces and each of said inductors all into closely coupled relation with each other, and passing a high frequency alternating current through said primary inductor whereby to induce current in both said workpieces and said secondary inductor, the current so induced in said workpieces serving to effect partial heating of said workpieces and the current induced in said secondary inductor serving, in turn, to induce additional current in said workpiecs for effecting further heating of said workpieces.

3. The method of heating, with the aid of a primary inductor and a closed secondary inductor arranged in closely coupled, coaxial relation, a plurality of elongated workpieces arranged in an array along a path also coaxial with said inductors, which comprises placing said workpieces in spaced substantially parallel relation to each other in said array between said inductors and conforming said secondary inductor to said workpieces in spaced substantially concentric relation thereto and projecting therebetween along the array, whereby to bring said workpieces and each of said inductors into closely coupled relation with each other, and passing an alternating current through said primary inductor whereby to simultaneously induce current in each of said workpieces and in said secondary inductor, the current so induced in each of said workpieces serving to effect partial heating of said workpieces, and the current in said secondary inductor serving, in turn, to induce additional current in each of said workpieces for effecting further heating of said workpieces.

4. In the manufacture of radio tubes including a plurality of hollow terminal prongs and a plurality of electrode leads extending into said prongs, the method of bonding said leads to their respective prongs, which comprises lining said prongs with a relatively low melting point solder, subjecting all of said prongs simultaneously to a radio frequency magnetic field between an outer primary inductor and an inner closed secondary inductor with said prongs therebetween whereby to induce in said prongs heating currents conforming said secondary inductor to said prongs in spaced substantially concentric relation thereto and projecting therebetween to increase the flow of said induced currents in said prongs whereby to produce sufficient heat therein relatively rapidly to melt said solder, and subsequently removing said magnetic field to permit said solder to harden and bond said leads to their respective prongs.

RUDOLPH A. BIERWIRTH.

REFERENCES CITED

The following references are of record in the file of this patent:

UNITED STATES PATENTS

| Number | Name | Date |
|---|---|---|
| 1,862,120 | Northrup | June 7, 1932 |
| 1,929,212 | O'Neill | Oct. 3, 1933 |
| 1,997,741 | Northrup | Apr. 16, 1935 |
| 2,408,229 | Roberds | Sept. 24, 1946 |